US008813087B2

(12) United States Patent  (10) Patent No.: US 8,813,087 B2
Nardelli et al.  (45) Date of Patent: Aug. 19, 2014

(54) MANAGING A WORKLOAD IN A CLUSTER OF COMPUTING SYSTEMS WITH MULTI-TYPE OPERATIONAL RESOURCES

(75) Inventors: Nicolas Nardelli, Boeblingen (DE); Robert Vaupel, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 12/483,495

(22) Filed: Jun. 12, 2009

(65) Prior Publication Data

US 2009/0313633 A1   Dec. 17, 2009

(30) Foreign Application Priority Data

Jun. 13, 2008 (EP) .................................. 08158191

(51) Int. Cl.
 *G06F 9/46* (2006.01)
(52) U.S. Cl.
 USPC ......................................................... 718/104
(58) Field of Classification Search
 None
 See application file for complete search history.

(56) References Cited

U.S. PATENT DOCUMENTS

| | | | |
|---|---|---|---|
| 5,473,773 A | 12/1995 | Aman et al. | |
| 5,504,894 A | 4/1996 | Ferguson et al. | |
| 5,537,542 A | 7/1996 | Eilert et al. | |
| 5,675,739 A | 10/1997 | Eilert et al. | |
| 5,974,462 A | 10/1999 | Aman et al. | |
| 6,249,800 B1 | 6/2001 | Aman et al. | |
| 6,314,463 B1* | 11/2001 | Abbott et al. | 709/224 |
| 2005/0044228 A1* | 2/2005 | Birkestrand et al. | 709/226 |
| 2006/0235675 A1* | 10/2006 | Oslake et al. | 703/21 |
| 2009/0049451 A1* | 2/2009 | Bates | 718/108 |

OTHER PUBLICATIONS

MVS Planning: Workload Management IBM, 14th Edition, Paril 2007.*
OS/390 MVS Planning: Workload Management, GC28-1781013, 2000.
OS/390 MVS Programming: Workload Management Services, GC28-1773-08, 2000.

* cited by examiner

*Primary Examiner* — Mengyao Zhe
(74) *Attorney, Agent, or Firm* — Steven Chiu

(57) ABSTRACT

Determining an equivalent capacity (ECP) of a computing system comprising multi-type operational resources. The multi-type operational resources comprises at least one general type of resources and at least one specialized type of resources Parameters characteristic of the performance of the system is determined. Assignment of work units to the various resources subject to pre-defined constraints is simulated. Utilization of said general type of resources of the computing system when executing the work units is calculated.

17 Claims, 6 Drawing Sheets

MANAGING A WORKLOAD IN A CLUSTER OF COMPUTING SYSTEMS WITH MULTI-TYPE OPERATIONAL RESOURCES

BACKGROUND

Field of the Invention

The present invention relates to managing the performance of user application program execution across a cluster of interconnected, cooperating, independent computing systems. Specifically, the invention provides a method for routing units of work in a cluster of computing systems containing multi-type operational resources such as multi-type processors. Even more specifically, the invention provides a method for determining the cost of executing a given unit of work in a computing system containing multi-type operational resources.

Workload management enables an installation to manage its workload against user defined goals or against user defined resource entitlements. Workload management functions also assist workload routes, middleware and distributed applications to place work in a multi system cluster. In a cluster, workload management functions collect information about the execution of work on the connected systems; a workload routing function requests this information at regular time intervals and uses it when distributing work to the individual systems. A variety of workload placement methods based on performance data are available. Once the work has been assigned to a given computing system, the system's workload management will attempt to provide the system resources necessary for the work to execute.

In recent years, general purpose computing systems have been increasingly enhanced with application specific functionalities, thus enabling them to process special types of work more efficiently and more cost-effectively. In order to implement this enhancement, existing general purpose computer systems have been equipped with specialized and assist processor types and processing facilities which permit off-loading specific applications such as graphics, processing of XML documents, Java code, etc. Such special-purpose processors are capable of processing selected units of work in a highly cost-efficient way.

As general purpose computing systems equipped with specialized functions are combined into a computer cluster, the specific application functionalities have the potential of greatly enhancing the capabilities of the computer cluster. In order to reap full benefits from such a cluster comprising dedicated computing systems, units of work arriving at this cluster have to be routed in such a way as to be processed by the best-suited computing system within the cluster, so that the function-specific capabilities of each computing system in the cluster can be used at its best. As specialized and assist processors might be unequally distributed among the connected systems within the cluster, conventional routing strategies based on simple capacity measures will not yield adequate results: depending on the kind of work to be processed, it may be far more advantageous to route this work to a system with dedicated low-cost computing power instead of routing it to the system with the highest available capacity.

Thus, there is a need for a routing method capable of distributing incoming work units in the computer cluster made up of computing systems equipped with differing operational resources.

BRIEF SUMMARY

It is an object of the invention to provide a method for calculating the cost of processing units of work in a cluster of computing systems possessing specialized processing features. Moreover, it is an object of the invention to provide a method and a system for routing units of work in a cluster of computing systems based on the cost of processing these units of work.

These objectives are achieved by the features of the independent claims. The other claims and the specification disclose advantageous embodiments of the invention.

According to a first aspect of the invention, a method for determining an equivalent capacity of a computing system containing multi-type operational resources is provided, said equivalent capacity being a measure of the cost of executing work on the computing system. The system's operational resources comprise at least one general type of resources and at least one specialized type of resources. The method comprises the steps of (1) determining parameters characteristic of the performance of the computing system, (2) simulating the assignment of work units to the system's various resources subject to pre-defined constraints and (3) calculating the utilization of the system's general type of resources when executing said work units.

According to a second aspect of the invention, a method for managing work in a cluster of computing systems containing multi-type operational resources is provided, said multi-type operational resources comprising at least one general type of resources and at least one specialized type of resources. The method comprises the steps of (1) determining operational parameters for the computing systems within the cluster, (2) evaluating an equivalent capacity of each computing system within the cluster based on the computing system's operational resources, the equivalent capacity being a measure of the cost of executing a given unit of work on the computing system, and (3) routing work to the computing systems of the cluster subject to their respective equivalent capacities.

According to a third aspect of the invention, a system for managing work in a cluster of computing systems containing multi-type operational resources is provided. The system comprises (1) a Parameter Determination Component for determining parameters characteristic of the performance of the systems in the cluster, (2) an ECP Evaluation Component for calculating an equivalent capacity (ECP) of each computing system within the cluster, the equivalent capacity (ECP) being a measure of the cost of executing a given unit of work on this computing system, and (3) a Routing Component (17) for routing work to a system of the cluster (1).

According to the invention, the routing of units of work in a cluster comprising several computing systems is no longer based solely on the available or displaceable processing power and performance characteristics of the systems within the cluster; rather, it also addresses the question of which of the computing system provides the correct processing facilities that enable low-cost or high-speed processing of the work unit. In order to implement this, a method for determining an equivalent capacity (ECP) of a computing system is provided, said equivalent capacity (ECP) being a measure of the cost of executing work on the computing system. Workload management draws on the equivalent capacities (ECP) of computing systems in the cluster when distributing work in the cluster. The invention thus provides a balance between capacity, performance characteristics and processing features within a cluster comprising several computing systems with differing dedicated facilities.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

Figure 1:
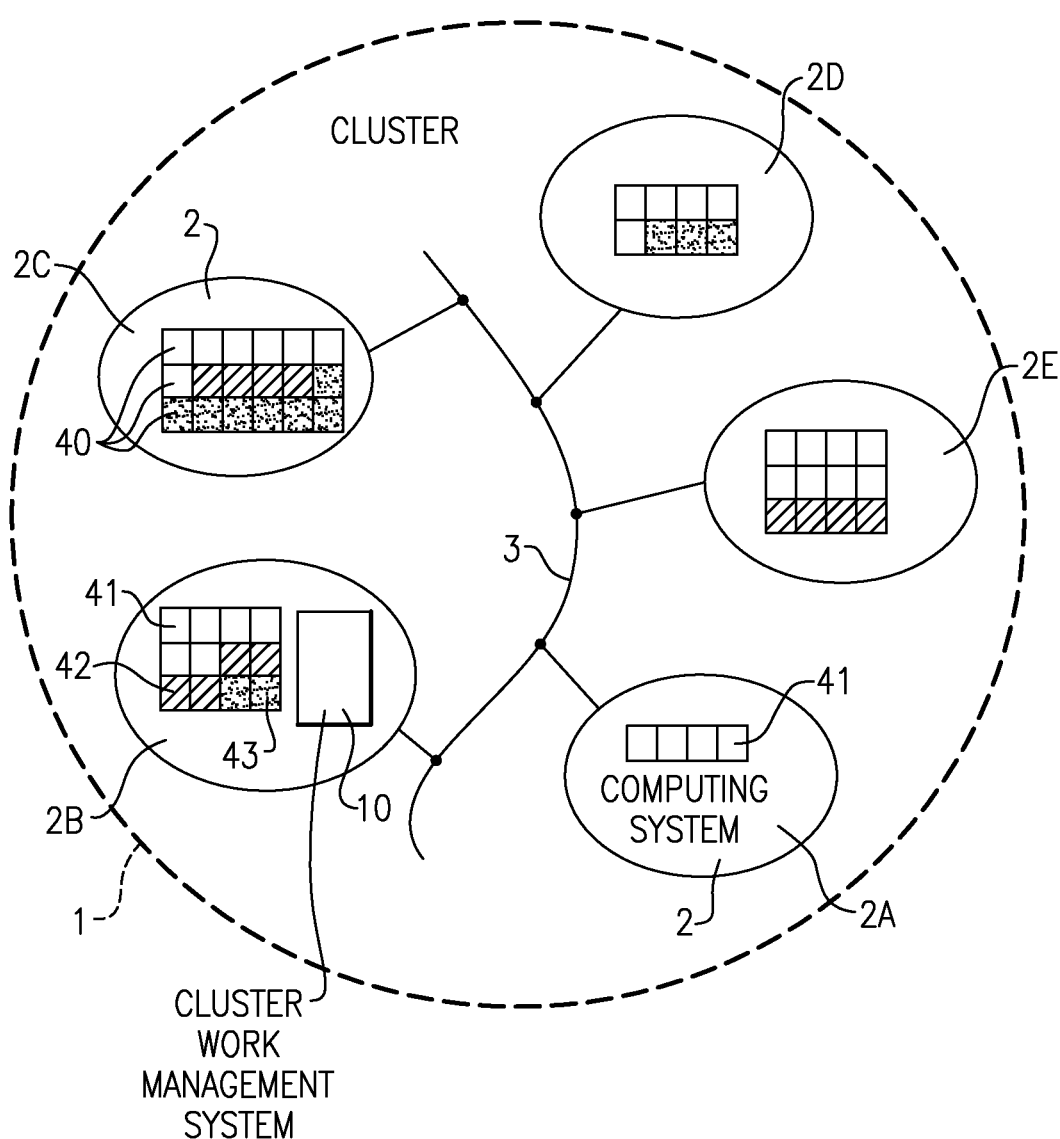
FIG. 1 a computing cluster comprising five individual computing systems.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

As a preliminary to discussing the method of the present invention, some prefatory remarks about the concept of workload management and transaction management (upon which the present invention builds) are in order.

Workload management is a concept whereby units of work (processes, threads etc.) that are managed by an operating system are organized into classes (referred to a service classes) that are provided system resources in accordance with how well they are meeting predefined goals. Resources are assigned from a donor service class to a receiver service class if the improvement in performance of the receiver service class resulting from such reassignment exceeds the degradation in performance of the donor service class. In short, reassignment takes place if there is a net positive effect in performance as determined by predefined performance criteria. Workload management of this type is characterized in that the assignment of resources is determined not only by its effect on the work units to which the resources are reassigned but also by its effect on the work units from which they are taken.

If the computing system under consideration supports transactions or business units of work to span multiple processes (so that work can be processed by multiple execution instances of the operating system), workload management is enhanced by transaction management features. Workload management systems of this general type are disclosed in the following patents and publications, incorporated herein by reference:

U.S. Pat. No. 5,504,894 to D. F. Ferguson et al., entitled "Workload Manager for Achieving Transaction Class Response Time Goals a in Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for managing a Server Workload According to Client Performance Goals in a Client/Server Data Processing System";

U.S. Pat. No. 5,675,739 to C. K. Eilert et al., entitled "Apparatus and Method for Managing a Distributed Data Processing System Workload According to a Plurality of Distinct Processing Goal Types";

U.S. Pat. No. 5,974,462 to J. D. Aman et al., entitled "Method and Apparatus for Controlling the Number of Servers in a Client/Server System";

U.S. Pat. No. 6,249,800 to J. D. Aman et al., entitled "Apparatus and Accompanying Method for Assigning Session Requests in a Multi-Server Sysplex Environment";

MVS Planning: Workload Management, IBM publication GC28-1761-00, 1996;

MVS Programming: Workload Management Services, IBM publication GC28-1773-00, 1996.

Of the patents, U.S. Pat. No. 5,504,894 and U.S. Pat. No. 5,473,773 disclose basic workload management systems; U.S. Pat. No. 5,537,542 discloses a particular application of the workload management system of U.S. Pat. No. 5,473,773 to client/server systems; U.S. Pat. No. 5,675,739 discloses an application of the workload management system of U.S. Pat. No. 5,473,773 to multiple interconnected systems; U.S. Pat. No. 5,974,462 discloses a method of controlling a number of servers assigned to handling work requests belonging to a given service class; and U.S. Pat. No. 6,249,800 describes a method for balancing work in an environment with systems belonging to different classes.

Figure 2:
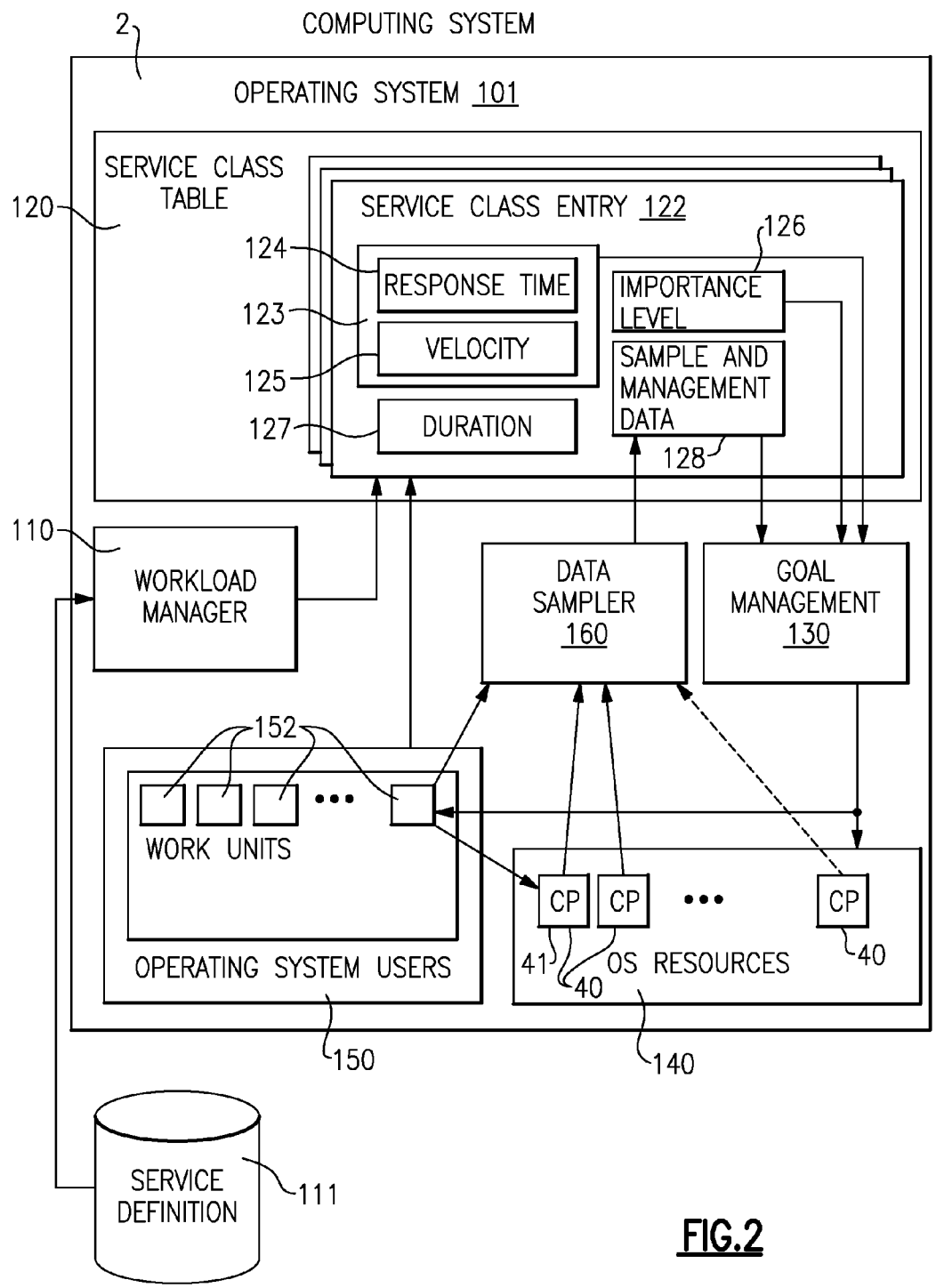
FIG. 2 a schematic diagram of a one of the computing systems of FIG. 1.

FIG. 2 shows a detailed schematic of a computing system 2 with an operating system 101. Operating system user space 150 contains a number of business work units 152 to be processed by operating system resources 140 comprising at least one processor 40.

Workload management component 110 identifies the operating system resources 140 which process a business unit of work 152 in parallel or in sequence. Note that the representation of the business units of work is distinguished from the execution units and the operating system constructs. Business units of work 152 with the same characteristics are associated with a service class. This is done based on attributes which are provided by the subsystems, middleware or applications which process the business units of work 152 and which are made useable to the client. The client then uses the attributes to define the classification characteristics of the business units of work 152 which associate them with the service classes (service definition 111). The service classes are associated with performance goals 123 (such as response time 124 and velocity 125) as well as an importance level 126 which tell the system how to deal with work in the given service class. Each of the goals specified by the system administrator causes the workload manager 110 to establish a performance class to which individual clients will be assigned. Each performance class is represented in the memory of operating system 101 by a service class entry 122 in a service class table 120. Among the information stored in a class table entry 122 pertaining to a given client are the performance goals 123 and their relative importance 126 as well as information on work duration 127. As soon as a work unit 152 is being processed by the system, it begins consuming system resources 140. A data sampling 160 component of operating system 101 collects information 128 on the system resources' 140 utilization and performance. Service class attributes 123, 126, 127 and performance data 128 of the various service classes stored in service class table 120 are used by goal management 130 component of operating system 101 as information for assigning resources 140 to work units 152. If resource consumption varies, this can result in a degradation for other work in the system, especially if long running business units of work use up a large amount of resources. Goal management allocates system resources 140 to work 152 in such a way as to best satisfy overall service class performance goals. In particular, resources may be transferred from a donor service class to a receiver service class if this leads to an overall performance improvement as determined by predefined goals. The general concept of goal management is well known and described e.g. in U.S. Pat. No. 5,974,462 cited earlier.

FIG. 1 depicts a schematic representation of a set of computing systems 2 (such as the one schematically shown in FIG. 2) running the same type of operating system and connected by a communication link 3. The computing systems 2A-2E form a cluster 1 of interconnected, cooperating, independent computing systems (such as, for example, System Z parallel sysplex).

While the internal resource and workload management of each computing system 2A-2E of the cluster 1 is provided by its workload management system 110, cluster 1 has to be equipped with additional work placement mechanisms in order to assure workload management within the cluster 1. Thus, cluster 1 comprises a cluster work management system 10 which classifies each incoming unit of work 152 and places it on the computer system 2 which is best positioned to process it; in the embodiment of FIG. 1, cluster work management system 10 resides in computing system 2B of the cluster 1.

A variety of criteria may be considered when assigning (routing) a unit of work 152 to a given computing system 2A within the cluster 1. In the simplest case, routing may be performed according to free capacity of the computing systems 2A. If the operating system 101 of computing system 2A is capable of distinguishing work units 152 according to their business category (i.e. by importance), routing may be performed based on free as well as on displaceable capacity within the computing system 2A. In this context, "free capacity" refers to computing resources which have not (yet) been assigned to any work, i.e. which can be considered as freely available. "Displaceable capacity" refers to computing resources which have been assigned to work of a comparatively low business category which will be displaced if work belonging to a higher priority class arrives, thus freeing "displaceable capacity" for the processing of high priority work. Additional factors may be considered which provide information on how well a given unit of work 152 is expected to execute on the individual computing systems (e.g. calculating a performance index for each kind of work unit).

These straightforward approaches may be successful in the case of all computing systems being of identical type with respect to their operational resources, notably if all systems 2A-2E have only one single type of processors (general purpose (CP) processors). In that case, units of work being processed on a given computer system would be able to exploit all operational resources available to this computing system indistinctively; due to the identical architecture of all systems in the cluster, units of work being processed on the cluster would experience the same environment and operating condition on each system in the cluster—the only potential difference between the systems being due to differences in size and/or processing power.

In the case of the cluster 1 of FIG. 1, however, the computing system 2A-2E comprise operational resources which differ from system to system. Here, the term "operational resources" denote hardware resources such as data processing capabilities and/or storage resources, operating systems etc. In the embodiment of FIG. 1, computing systems 2A-2E are equipped with specialized processing functions and thus differ with respect to the processor types contained in systems 2A-2E (the term "processor type" denoting a processor type or a processing feature capable of executing certain types of work). Besides containing differing numbers of general purpose (CP) processors 41, systems 2B-2E also contain differing numbers of assist and specialized processors 42, 43. These assist and specialized processors 42, 43 are capable of executing certain units of work 152 at a much lower cost or higher speed than general purpose (CP) processors 41. For example, using an assist processor may reduce the processing cost for a given application drastically. In the embodiment of FIG. 1, processor type 42 indicates a first kind of specialized processor (e.g. a System z Application Assist processor zAAP, abbr. ZA) whereas processor type 43 denotes a different kind of specialized processor (e.g. a System z Integrated Information processor zIIP, abbr. ZI).

When selecting the one computing system 2 within cluster 1 which is best suited to process a given work, it is not sufficient to determine which system has the highest free or displaceable capacity, but also which of the systems would be best suited to process the specific unit work based on the work's usage of assist and specialized processors 42, 43. Thus, it may be less costly and thus preferable to send work to a low-capacity system equipped with dedicated assist and/or specialized processors 42, 43 rather than to a system with a high capacity of general (regular) processors 41. Executing work on regular (CP) processing capacity 41 which could just as well be executed on low cost assist and specialized processors 42, 43 might thus have a negative cost effect on the installation.

For each computing system 2 within the cluster 1, the available processing capacity is determined for each type of processor 40 realized in this computing system 2. If the computing system's operating system 101 supports business objectives, the available processing capacity corresponds to the displaceable processing capacity on each importance level 126; this displaceable processing capacity at each importance level 126 is calculated based on a weighting algorithm (cost factor) to account for differences in importance levels. The available or displaceable processing capacity is expressed in terms of a comparative metric named service units (SU). In the embodiment of FIG. 1, computing system 2A containing only general purpose (CP) processors 41 has a standard (CP) processor 41 capacity of 1000 SU. Computing system 2B has a standard (CP) processor (41) capacity of 1500 SU, a specialized Application Assist (ZA) processor (42) capacity of 1000 SU and a specialized Integrated Information (ZI) processor (43) capacity of 500 SU.

Each application to be executed on a computing system 2 of cluster 1 uses the existing hardware features of this system 2 to a different extent. In order to obtain data on typical hardware usage within computing system 2, comparative utilization measurements are carried out and analyzed periodically for the various applications (or service classes) submitted to computing system 2. In doing this, utilization data for all processors 40 available for work placement within this computing system are recorded with respect to the applications (or service classes) considered. These data yield information on the way typical work belonging to a given service class is executed by the individual processor types 41-43 of the computing system under consideration. In computing system 2A comprising only general purpose (CP) processors 41, 100% of the work is executed by the CP processors, irrespective of service class. In computing system 2B comprising CP processors 41 as well as specialized processors 42, 43, the relative percentages of work executed by processor types 41, 42, 43, the so-called usage repartition percentages, may amount to 20%, 60%, 20% respectively for a given first service class SC1 of work executing on system 2B. For a second service class SC2, the usage repartition percentages of processor types 41, 42, 43 may amount to 60%, 40%, 0% respectively, indicating that work of the second service class SC2 running on system 2B relies much more heavily on general (CP) processor 41 capacity than work of the first service class SC1.

Usage repartition percentages corresponding to the usage of processing units by application (or service class) are determined at regular time intervals for each computing systems 2 of the cluster 1 and are transmitted to the cluster's workload management system 10 which takes these into account when routing work to the individual computing systems.

Based on the available capacity of the various types of processors 41, 42, 43 in computing system 2 as well as the usage repartition percentages of the processor types for a given service class (as determined from processor usage measurements taken at this service class), a so-called equivalent displaceable CP capacity (ECP) of computing system 2 executing work of this service class is calculated. The ECP is a measure of the displaceable capacity, altered by the cost of running a given work on a given computing system.

Since assist and specialized processor 42, 43 capacity is much less costly than general purpose (CP) processor 41 capacity, work units are assigned to the processors 40 in a given computing system 2B containing specialized processor 42, 43 capacity according to the following rules:

I. Work units that can be processed on assist or specialized processors 42, 43 will be processed on these processor types whenever possible.
II. If a specialized processor type 42, 43 is exhausted, a standard (CP) processor 41 will take over the processing; this reassignment of work from specialized processors 42, 43 to general purpose (CP) processors 41 is called crossover. However, since general purpose (CP) computing resources are more expensive than assist or specialized computing resources, crossover is subject to a crossover cost factor.
III. If the standard processor 41 is exhausted, no more work can be placed on the system under consideration.

The crossover cost factor will be equal to 1 if the work unit executes on its designated processor type. If—due to exhaustion of specialized processor 42, 43 capacity—work designed for this specialized processor type 42, 43 must be executed on a standard (CP) processor 41, the crossover cost factor will be >1. The crossover cost factor is thus a measure of the cost-related disadvantage of executing a given unit of work on a general purpose (CP) processor rather than a specialized processor 42, 43. Note that different crossover cost factors can be defined for different processor types 42, 43.

The ECP (equivalent displaceable CP capacity) of computing system 2 is determined by an iterative method based on steps I-III as cited above; according to this method, work which is targeted at assist/specialized processors 42, 43 but which—due to exhaustion of these assist/specialized processors 42, 43—is executed on standard (CP) processors 41 is factored in with a crossover cost factor >1.

Figure 4:
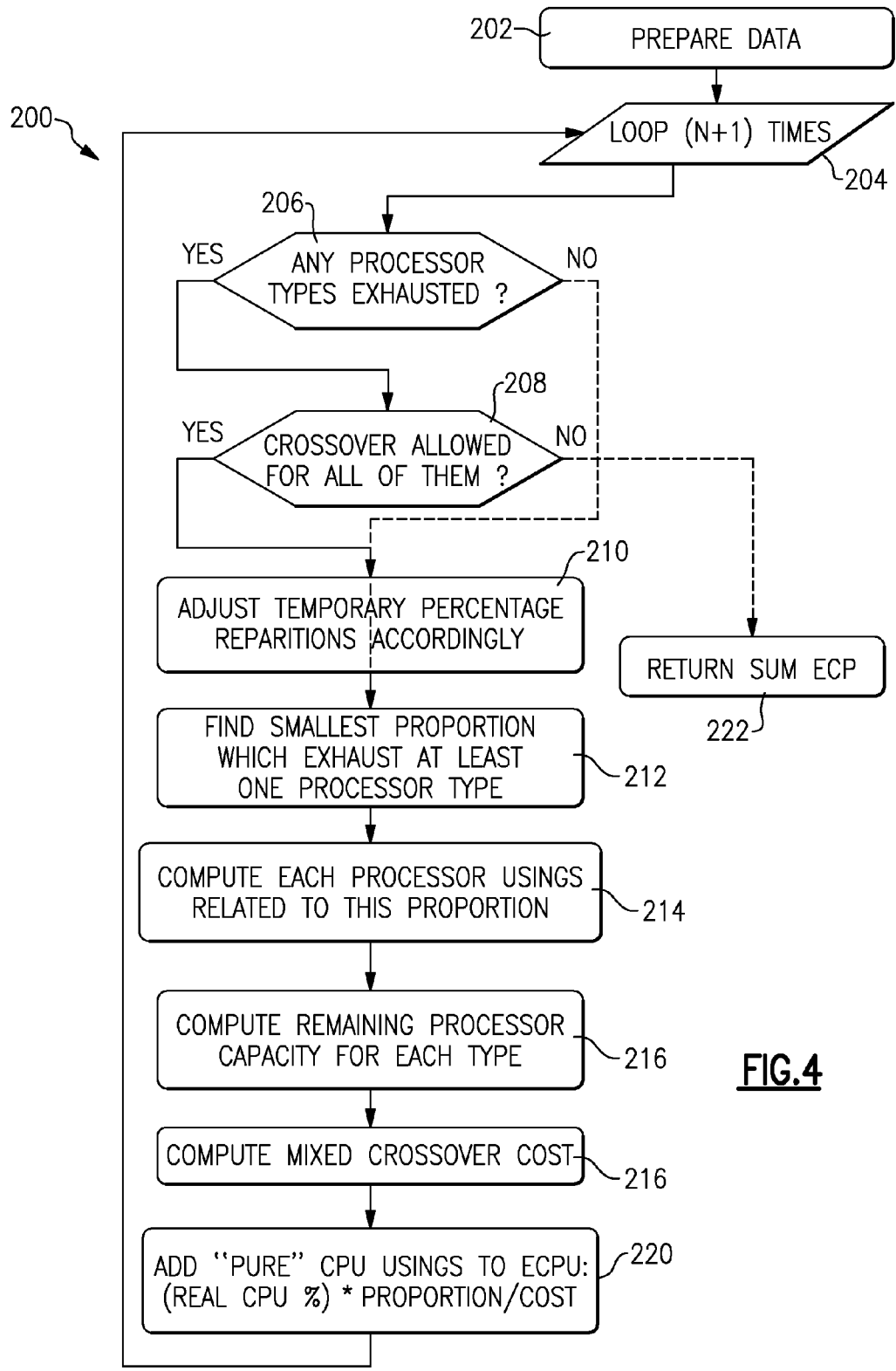
FIG. 4 a schematic flow diagram of a method for calculating equivalent CP usings (ECP)
Figure 5:
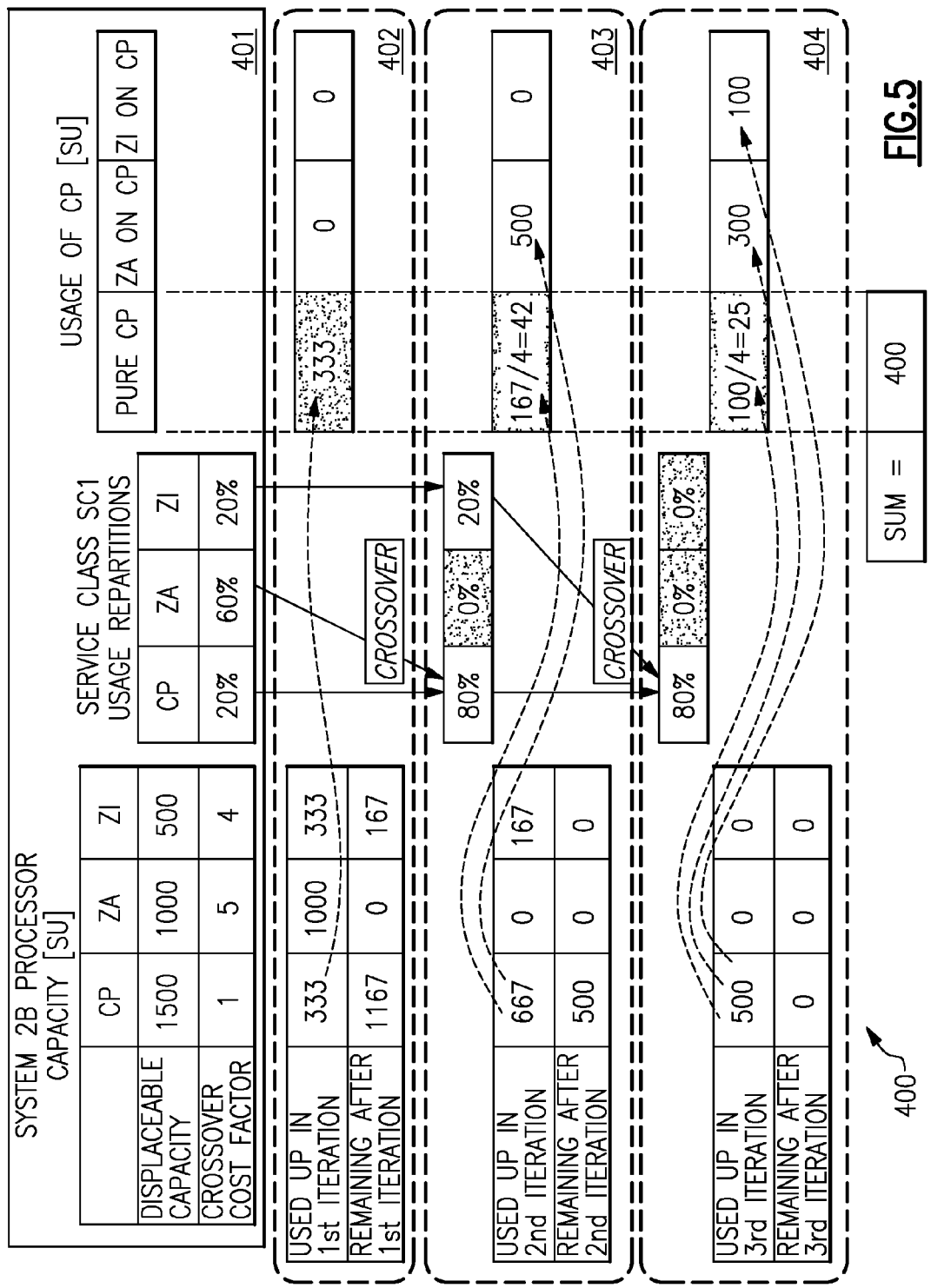
FIG. 5 a table depicting the steps of the method of FIG. 4 when applied to a computing system executing work of a given service class SC1.

FIG. 4 shows a schematic flow diagram 200 of a preferred embodiment of the method of calculating the ECP for work belonging to a given service class executing on a given computing system 2. FIG. 5 shows a table 400 detailing the steps of the method of FIG. 4 for work executing on computing system 2B with processor types CP, ZA and ZI (general purpose (CP) processors 41 as well as assist (ZA) and specialized (ZI) processors 42, 43); the work considered belongs to a service class SC1 with usage repartition percentages of 20%, 60%, 20% pertaining to the processor types CP, ZA, ZI respectively. Computing system 2B has a standard (CP) processor 41 capacity of 1500 SU, a ZA processor capacity of 1000 SU and a ZI processor capacity of 500 SU. Crossover from specialized processor types ZA, ZI to general purpose (CP) processors is assumed to be permitted, but subject to crossover cost factors of 5 (for crossovers ZA→CP) and 4 (for crossovers ZI→CP). These parameters are shown in header 401 of table 400.

In a first processing step 202, parameters such as the processing capacity of the computing system 2B under consideration as well as the processor requirements of the work to be performed are set. Subsequently, an iterative process (loop 204) is performed N+1 times, N being the number of specialized processor types in the computing system under consideration (in the case of system 2B, N=2). In each iteration, the processor type which is the first to be exhausted by the application is determined (step 212). In the example of FIG. 5, during the first iteration 402 this applies to processor type ZA since after 1667 units of service class SC1 work, available ZA capacity of 1000 will be exhausted (1000=1667*60%). In the next steps 214, 216, the usings of each processor type as well as remaining capacity of other processor type are determined. In the example of FIG. 5, 1000 SU of ZA capacity and 333 SU each of CP and ZI capacity were used in the first iteration 402, so that 1167 SU of CP capacity and 167 SU of ZI capacity remains while the full ZA capacity is used up. Subsequently (step 220), the equivalent displaceable standard (CP) processor capacity is calculated; in the example of FIG. 5, 333 SU of CP capacity were used up in iteration 402, so that the ECP counter is increased by an amount of 333 SU.

Since ZA capacity was fully depleted in first iteration 402, and since crossover from ZA processing capacity to CP processing capacity is allowed, the next iteration 403 of loop 204 will begin by temporarily adjusting the service class usage repartition percentages (steps 206-210); this means that the requirements for ZA processing capacity are shifted on top of the CP capacity requirements. As these readjusted repartition percentages are executed on the CP and ZI capacities remaining after the first iteration, it is found (step 212) that processor type ZI is exhausted before processor type CP since after 833 units of work with the readjusted repartition percentages, available ZI capacity of 167 will be reduced to zero (167=833*20%). In the next steps 214, 216, the usings of each processor type as well as remaining capacity of other processor type is determined again; in the example of FIG. 5, 667 SU of CP capacity and 167 SU of ZI capacity was used during this first iteration 403, so that 500 SU of CP capacity remain while the full ZI and ZA capacities are used up. When calculating the second iteration's 403 contribution to the equivalent displaceable standard (CP) processor capacity (step 220), crossover cost has to be considered due to the fact that ZA→CP crossover is subject to a crossover cost factor of 5. However, only the readjusted repartition percentages of 80% of CP capacity is used, so that a mixed crossover cost MC=(1*20%+5*60%)/80%=4 applies (step 218). Thus, the ECP count is increased by an amount of 167/MC=42.

The third iteration 404 of loop 204 proceeds analogously to the second iteration 403 except that this time ZI as well as ZA capacities are fully depleted. Thus, since crossover from ZA processing capacity to CP processing capacity is allowed, service class usage repartition percentages are adjusted in such a way that ZI processing requirements are shifted on top of CP requirements as well (steps 206-210), so that the work's processing requirements have to be met by CP processors alone (100%). The CP processing capacity of 500 SU remaining after the second iteration will be reduced to zero after 100 usings (100=500*20%). The third iteration 404 contributes only an amount of 25 SU to the equivalent displaceable standard (CP) processor capacity (step 220) since ZI→CP crossover is subject to a crossover cost factor of MC=(1*20%+5*60%+4*20%)/100%=4.

Finally, since CP capacity has been exhausted and since no other processor types are available (steps 206 and 208), the process is terminated and the resulting value for ECP returned (step 222). In the example of FIG. 5, the ECP thus determined amounts to 400 SU. This means that, when executing work of service class SC1, computing system 2B is equivalent to an (idealized) computing system comprising 400 SU of CP processing capacity, 1200 SU of ZA processing capacity and 400 SU of ZI processing capacity.

Figure 6:
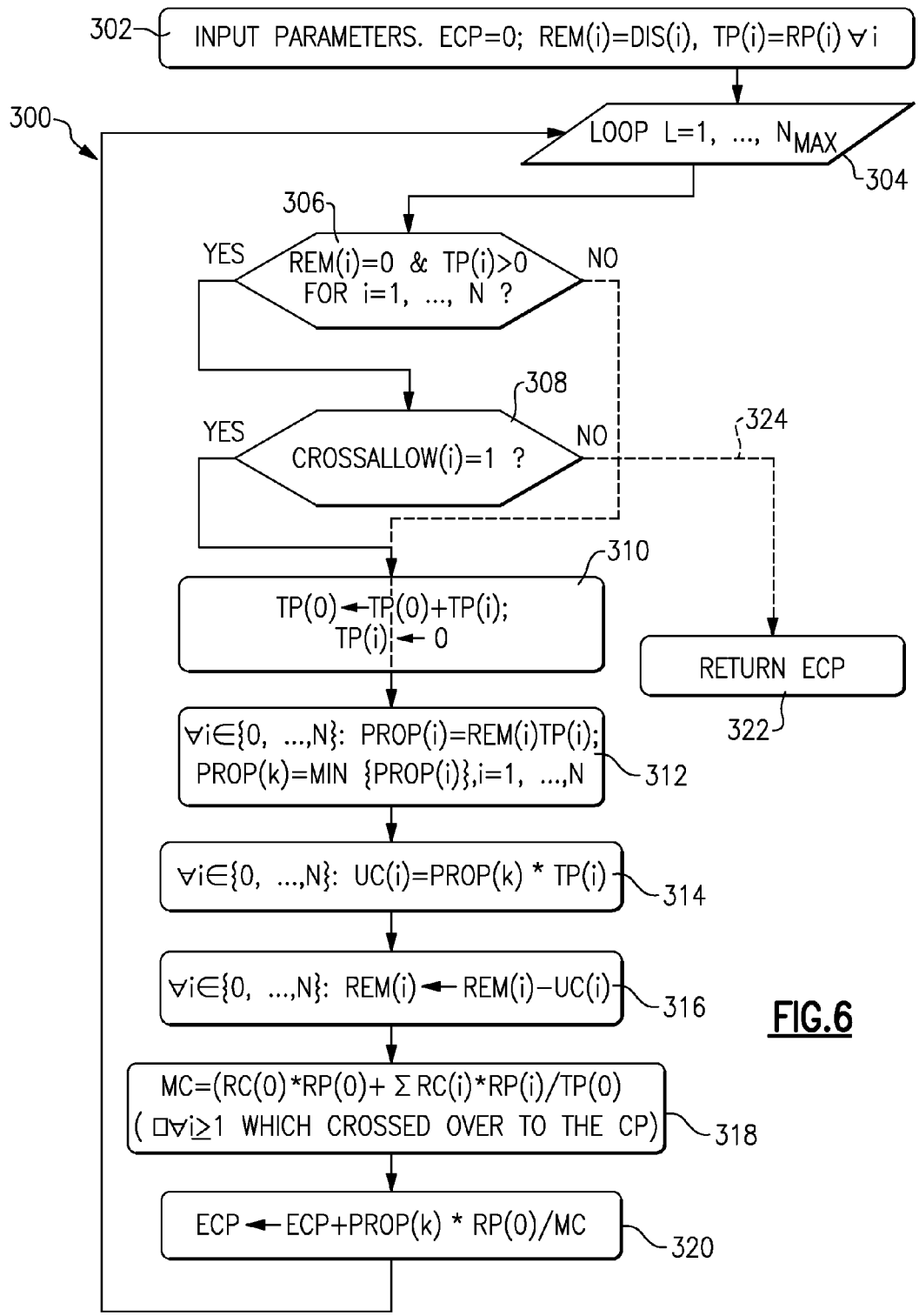
FIG. 6 a diagram of a mathematical description corresponding to the method of FIG. 4.

FIG. 6 shows a mathematical description of the method flow diagram of FIG. 4. Computing system 2 under consideration is assumed to comprise processors of one general (CP) processor type as well as of zero or more specialized processor types which may or may not permit crossovers to general (CP) processor capacity, depending on the options specified.

Each processor type is given a unique index PT. PT(0) notifies the general (CP) processor type while PT(i) (i=1, . . . , N) notifies the N specialized processor types implemented in system 2; in the example of FIG. 5, PT(1)=ZA, PT(2)=ZI.

Each processor type PT is assigned a "relative crossover cost to CP", denoted by RC(i); for example, RC(2) denotes the relative cost of a crossover from specialized processor type PT(2)=ZI to general (CP) processor capacity. Of course, RC(0)=1 (i.e. crossover from CP to CP causes no additional cost), and RC(i)≥1 for all i=1, . . . , N.

Each application (or service class) is assigned an application specific Usage Repartition Percentage RP(i) with respect to each processor type PT(i) (i=0, . . . , N). For all i, RP(i)>0, and $\Sigma_i$ RP(i)=1. In the example of FIG. 5, the application is made up of RP(0)=20% (CP requirement), RP(1)=60% (ZA requirement) and RP(2)=20% (ZI requirement). To avoid divisions by 0, RP(0) (for the CP) must be set >0; for example one can set the minimum RP(0) to 0.1%.

Parameter DIS(i) (i=0, . . . , N) denotes the Displaceable Capacity for processor type PT(i) at the selected importance level IL. Displaceable Capacity is expressed in term of service units (SU). In the example of FIG. 5, system 2B operates at an importance level at which DIS(0)=1500 SU (for CP capacity), DIS(1)=1000 SU (for ZA capacity) and DIS(2)=500 SU (for ZI capacity).

A variable TP(i) (i=0 . . . N) is defined to denote a Temporary Percentage Repartition of the request under consideration. In the example of FIG. 5, during the 2nd iteration 403, TP(0)=80%, TP(1)=0% and TP(2)=20%, whereas during the 3rd iteration 404, TP(0)=100%, TP(1)=0% and TP(2)=0%.

A variable REM(i) (i=0, . . . , N) is defined to denote a Remaining Capacity of processor type i. In the example of FIG. 5, during the first iteration 402, REM(0)=1167 (remaining CP capacity), REM(1)=0 (remaining ZA capacity) and REM(2)=167 (remaining ZI capacity).

Finally, a parameter CrossAllow(i) denotes whether crossover from a processor type i=1, . . . , N to general (CP) processor capacity is allowed (in which case CrossAllow(i)=1) or forbidden (in which case CrossAllow(i)=0). Note that CrossAllow(0)=0.

At the outset of the method depicted in FIG. 6, (step 302), all parameters are entered and all variables are initialized. The method runs for a maximum number $N_{Max}$ of loops L (step 304), where $N_{Max}$=1+$\Sigma_i$ CrossAllow(i). In each loop, the following steps are executed:

Step 306 checks for each processor type PT(i), (i=0, . . . , N) whether REM(i) is strictly positive. If not, and if TP(i) is strictly positive and if crossover is allowed for the corresponding processor type PT(i) (i.e. CrossAllow(i)=1), see step 308, crossover is implemented by adding the Temporary Percentage TP(i) of processor type i to TP(0) and setting TP(i)=0 (step 310).—If in steps 306 and 308 a processor type PT(k) is found for which REM(k)=0, CrossAllow(k)=0 and TP(k)>0, (i.e. having no remaining capacity, no ability crossover, but needed for executing the request), the loop is exited (arrow 324) since it is not possible to make the computing system 2 under consideration accept more work).

If REM(i) is strictly positive for all specialized processor types i (or if crossover is allowed), the next step 312 determines which processor type PT(i) will be exhausted first when a load proportional to the temporary percentage TP(i) is sent to each processor type. For each processor type PT(i) having TP(i)>0, the proportion PROP(i)=REM(i)/TP(i) is computed, and the index k of the smallest value of the set {PROP(i)} indicates the processor type which will be exhausted first.

For each processor type PT(i), the number of usings is calculated as UC(i)=PROP(k)*TP(i) in step 314, and from each remaining capacity REM(i), the number of usings UC(i) is subtracted in step 316. By construction, REM(k) becomes 0 in this step 316, while all other REM(i) become positive or 0.

In step 318, the mixed crossover cost MC is calculated. MC is the mean of the general (CP) relative crossover cost RC(0)=1 and of all relative crossover costs RC(i) (for each processor type i which was crossed over to the general processor type) weighted by their respective Usage Repartition Percentages RP(i). Per construction, the sum of these RP(i) with RP(0) is equal to TP(0). The mixed crossover cost MC is used to calculate the usage contribution to the ECP acquired in this iteration of loop 304 (step 320).

There are various ways of calculating the mixed crossover cost MC which characterizes the cost of processing work on general purpose (CP) processors 41 instead of dedicated specialized processors 42, 43. In a first variation, RC(i)=$RC_{global}$ i.e. a constant for all specialized processor types I=1, . . . , n). This variation yields good results whenever CP capacity is low compared to specialized processor capacity, and if relative crossover costs are about the some for the specialized processor types.

In a second variation, an original cost OC=$\Sigma_i$ RP(i)/RC(i) is calculated; then, for each iteration of loop 304, the step cost SC=$\Sigma_i$ TP(i)/RC(i) is calculated; the mixed crossover cost is then determined as MC←SC/OC.

A third variation is related to the number of steps: The client may want its applications to always execute at the very lowest cost. In this case, crossover is not allowed at all, and the iterative method will terminate after only one iteration. This variation will yield adequate results if the client knows that the workload is small enough to never create a crossover need.

The ECP number obtained at step 322, i.e. after performing all iteration of loop 304, expresses how many service units (SU) the computing system under consideration is able to provide at a given service class level and at a given level of crossover cost. This ECP number thus is a measure of the (low) cost of processing work in the given computing system and takes into account the following characteristics and parameters:
available capacity of the given computing system;
displaceable capacity of the given computing system (if the operating system supports a differentiation of work units based on business objectives);
processing features and their equivalent capacity;
performance characteristics of the work units to be executed.

The method described in conjunction with FIG. 4 and FIG. 6 combines these different aspects in the form of a combined factor, i.e. the ECP number, which can be used by workload routers to place work in a cluster 1 comprising multiple computing systems 2A-2E capable of processing the same application (besides other applications).

In order to decide which system 2A-2E of cluster 1 work belonging to a given application or service class should be sent to, the process outlined in FIG. 4 is performed for all systems 2A-2E with respect to work of the service class under consideration. This requires that all systems 2A-2E under consideration within the cluster 1 provide equivalent data for their importance levels, service units consumed and displaceable capacity at the various importance levels. Based on these parameters, ECP values of all systems 2A-2E under consideration are calculated and compared at a given importance level and service class to yield a relative cost of all systems 2A-2E. Specifically, the ECP of each system under consideration can be normalized with respect to a maximum value defined for the cluster 1 or can be expressed as a relative fraction of the sum of alls ECPs corresponding to the systems to be compared.

In the example of FIG. 5, the ECP of computing system 2B at service class SC1 was determined to be 400. If the remaining computing systems 2A, 2C, 2D and 2E of cluster 1 were evaluated accordingly and were found to yield ECP values of 500, 800, 100 and 200 respectively, the relative weights of system 2A-2E would amount to 25%:20%:40%:5%:10%. These relative weights can be used by cluster routing system 10 to dispatch incoming work of service class 1 accordingly, i.e. by sending 25% of this work to system 2A, 20% to system 2B etc. Note that the relative weights of the ECPs can be influenced by the client: If the client sets the crossover cost factors RC(i) to a high value (>>1), crossover will almost be suppressed, i.e. work will be preferentially sent to computing systems where the work can execute on (low-cost) specialized processing power rather than to systems where (high-cost) general purpose (CP) must be used. On the other hand, if the client sets the crossover cost factors RC(i)=1, work is sent to whichever system has the highest available processing capability, irrespective of processor type.

The relative weights of computing systems 2A-2E as computed above apply well for heterogeneous clusters containing systems with the same basic CP architecture. More generally, clusters having a mix of computer architectures may be analyzed in a similar way. For example, some of the systems 2A, 2B of cluster 1 may have UNIX architectures whereas other systems 2C-2E may be PC systems. In order to manage a cluster of this kind, a Relative Architecture Cost (AC) is defined which corresponds to the relative cost of running a given amount of work (SU) on a general processing unit (CPU) of one architecture in comparison with a different architecture. For example, taking an x686 as the reference architecture and assuming that work running on a POWER P5 costs three times as much as on a x686, the corresponding relative architecture cost AC(j)=3 (for running work on the system with index j having a POWER P5 architecture rather than on the reference system. A minimum architecture cost MIN(AC) of all in the systems in the cluster is defined by $MIN(AC)=\min_j \{AC(j)\}$. An Expense Rejection Factor RF is defined which reflects how adverse a client is to displacing work from low-cost onto more expensive architecture. If cost is not a factor, RF=0; if the client wants to exploit low-cost computing power whenever possible, RF>>1. Equivalent CPU usings in a heterogeneous architecture environment may be computed by $AECP(j)=ECP* [MIN(AC)/AC(j)]**RF$ ($\forall$ j), corresponding to shifting equivalent capacities from one architecture to another one. Using this, less work requests are sent to systems with high cost architectures, in an inverse proportion to these systems' relative costs. By normalizing the AECP values, one obtains relative weights of the systems within the cluster. Table 1 shows an example for a cluster with four computing systems having different equivalent CP capacities ECP and different architectures (and, correspondingly, different architecture costs AC).

TABLE 1

|  | System S1 | System S2 | System S3 | System S4 |
|---|---|---|---|---|
| ECP | 400 | 500 | 600 | 100 |
| AC | 3 | 4 | 5 | 1 |
| AECP with RF = 0 | 400 | 500 | 600 | 100 |
| Weight | 25% | 31.25% | 37.5% | 6.25% |
| AECP with RF = 1 | 133.3 | 125 | 120 | 100 |
| Weight | 27.9% | 26.1% | 25.1% | 20.9% |
| AECP with RF = 2 | 44.4 | 31.2 | 24 | 100 |
| Weight | 22.3% | 15.6% | 12% | 50.1% |

Note that if the user sets RF=0, architecture is not an issue when assigning work to the individual systems; rather, work is assigned based on equivalent CP capacity (ECP) alone. If, however, the user sets R=2, system S4 with a low-cost architecture (AC=1) will get more work requests than system S1 with high-cost architectures (e.g. with AC=3), even though the high-cost system S1 has higher equivalent capacity; only when the low-cost system's capacity is exhausted will the high-cost systems obtain considerable work request.

Figure 3:
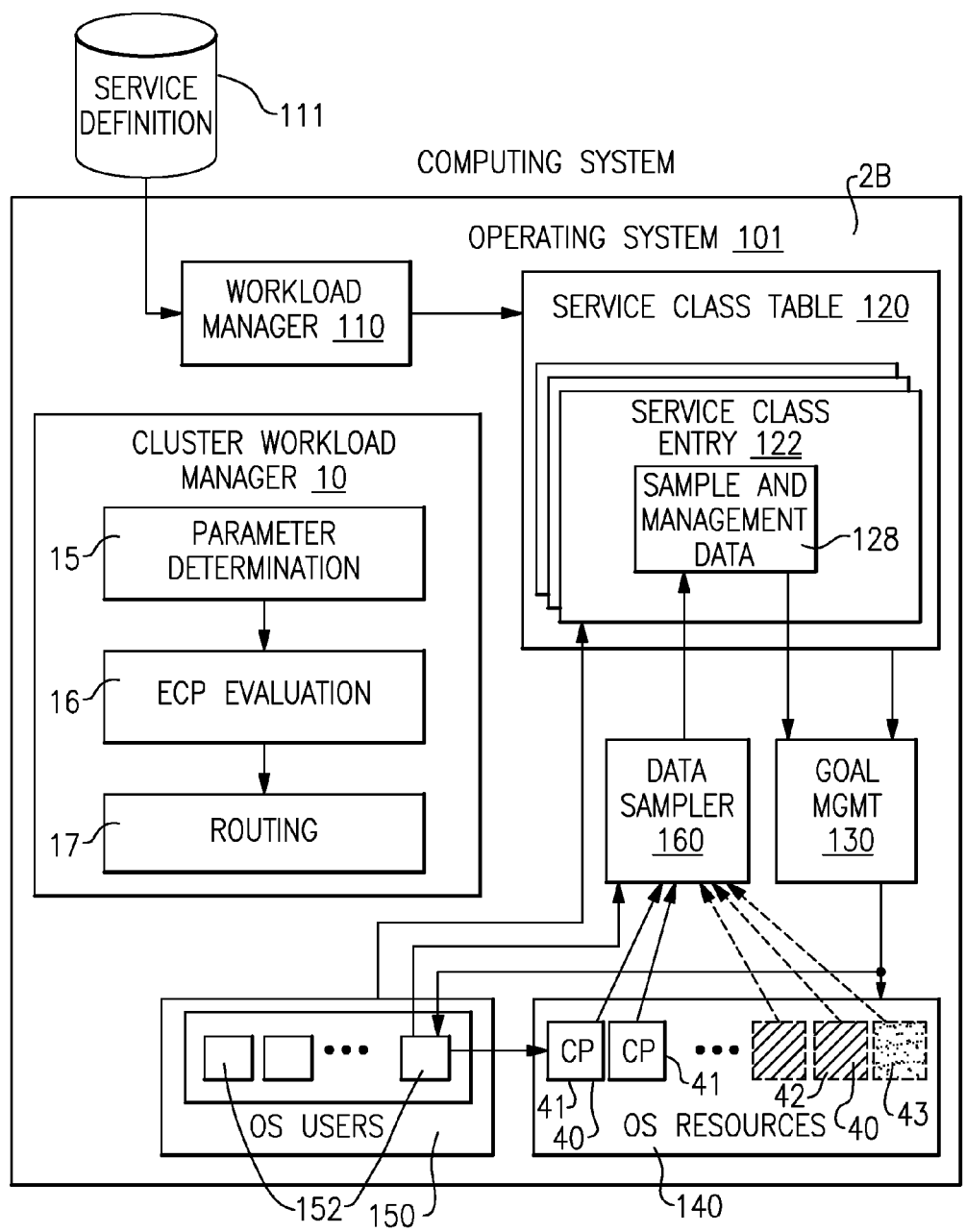
FIG. 3 a schematic diagram of one of the computing systems of FIG. 1 as equipped with a cluster workload management system.

Referring now to FIG. 3, a schematic of a computing system 2B is shown which generally corresponds to computing system 2A, but differs in that computing system 2B contains Cluster Workload Management System 10 residing in operating system 101 of computing system 2B. Work requests submitted to the cluster 1 by clients (end users at terminals or else programs executing in other computer systems) are investigated by Cluster Workload Management System 10 and directed to one of the cluster 1 computing systems 2A-2E subject to a set of rules. Cluster Workload Management System 10 comprises a Parameter Determination Component 15 for collecting and evaluating all relevant parameters characterizing computing systems 2A-2E and needed for assigning work to these systems 2A-2E. These parameters include displaceable capacities at the importance levels, relative usage of different processing resources (41, 42, 43) at a given service class etc. Each computing system 2A-2E periodically evaluates its processor 41, 42, 43 usage at different service levels and transmits these usage data regularly to Parameter Determination Component 15 of Cluster Workload Management System 10. Using the data acquired by Parameter Determination Component 15, ECP Evaluation Component 16 calculates the ECPs for each system 2A-2E of cluster 1 subject to given service class and importance level. Depending on the ECP values determined in component 16 using the method described above, Router 17 directs the work request submitted by the client to the system within the cluster 1 which is best suited for executing it. While FIG. 1 depicts an embodiment in which the cluster work management system 10 resides in on of the cluster's computing system 2B, it can also reside on a separate computing system (not shown in FIG. 1).

While the concept of determining an equivalent capacity and of managing work in a cluster 1 of computing systems 2 containing multi-type operational resources was described in terms of computing systems 2 with different types of processors 41, 42, 43, these concepts are equally applicable for clusters of systems differing with respect of other operational resources such as different storage resources, different operating systems etc.

The present invention can be implemented as a computing system 2B and/or a program product for managing work in a cluster 1 of computing systems 2A-2E containing multi-type operational resources 41, 42, 43. In particular, the present invention can be implemented as a computing system 2B and/or a program product for determining an equivalent capacity of said computing system 2B containing multi-type operational resources.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The invention claimed is:

1. A method for managing a workload in a plurality of computing systems, each of said plurality of computing systems comprising one or more general resources and one or more specialized resources, the method comprising:
   determining, by a computer, parameters characteristic of a performance of said each of said plurality of computer systems, said parameters comprising a crossover factor for each of said one or more specialized resources and each of said one or more general resources;
   calculating, by said computer, an equivalent capacity (ECP), said ECP being a measure of a processing capacity of a computing system, said calculating comprising:
      based on said parameters and a test workload, exhausting said one or more specialized resources, and assigning a remaining workload of said test workload to said one or more general resources to determine utilization of said one or more general resources; and
      wherein said calculating of said ECP is based on said utilization of said one or more general resources, and is based on said crossover factor for said each of said one or more specialized resources and said each of said one or more general resources, wherein said crossover factor is based on a cost of said assigning of said remaining workload to said one or more general resources; and
   based on said ECP for said each of said plurality of computing systems, assigning, by a computer, said workload to an appropriate computing system selected from said plurality of computing systems.

2. The method according to claim 1, wherein said parameters comprises a displaceable capacity for said each of said one or more specialized resources and said each of said one or more general resources.

3. The method according to claim 2, wherein the displaceable capacity is determined at a given importance level.

4. The method according to claim 1, wherein said parameter comprises a relative usage for said each of said one or more specialized resources and said each of said one or more general resources, wherein the relative usage is determined with respect to a service class of work executing on the computer system.

5. The method according to claim 4, wherein the relative usage is periodically measured.

6. The method according to claim 1, wherein said assigning said remaining workload of said test workload to said one or more general resources further comprises:
   terminating said remaining workload assignment once said one or more general resources is exhausted.

7. The method according to claim 6 further comprising assigning a said crossover factor whenever work is assigned to said one or more general resources instead of said one or more specialized.

8. The method according to claim 7, wherein the crossover factor is specific to a type of said one or more specialized resources.

9. The method according to claim 1 further comprising calculating another equivalent capacity (AECP) of a computing system in a heterogeneous architecture environment by multiplying said system's ECP with a factor depending on said system's relative architecture cost (AC).

10. A system for managing a workload in a plurality of computing systems, each of said plurality of computing systems comprising one or more general resources and one or more specialized resources, comprising:
   a memory;
   a processor in communications with said memory, said processor capable of performing a method comprising:
      determining parameters characteristic of a performance of said each of said plurality of computer systems, said parameters comprising a crossover factor for each of said one or more specialized resources and each of said one or more general resources;
      calculating an equivalent capacity (ECP), said ECP being a measure of a processing capacity of a computing system, said calculating comprising:
         based on said parameters and a test workload, exhausting said one or more specialized resources, and assigning a remaining workload of said test workload to said one or more general resources to determine utilization of said one or more general resources; and
         wherein said calculating of said ECP is based on said utilization of said one or more general resources, and is based on said crossover factor for said each of said one or more specialized resources and said each of said one or more general resources, wherein said crossover factor is based on a cost of said assigning of said remaining workload to said one or more general resources; and
      based on said ECP for said each of said plurality of computing systems, assigning, by a computer, said workload to an appropriate computing system selected from said plurality of computing systems.

11. The system according to claim 10, wherein said parameters comprises a displaceable capacity of said each of said one or more specialized resources and said each of said one or more general resources.

12. The system according to claim 11, wherein the displaceable capacity is determined at a given importance level.

13. The system according to claim 10, wherein said parameter comprises a relative usage for said each of said one or more specialized resources and said each of said one or more general resources, wherein the relative usage is determined with respect to a service class of work executing on the computer system.

14. The system according to claim 13, wherein the relative usage is periodically measured.

15. The system according to claim 10, wherein said assigning said remaining workload of said test workload to said one or more general resources further comprises:
   terminating said remaining workload assignment once said one or more general resources is exhausted.

16. The system according to claim 15 further comprising assigning said crossover factor whenever work is assigned to said one or more general resources instead of a said one or more specialized.

17. The system according to claim 16, wherein the crossover factor is specific to a type of said one or more specialized resources.

* * * * *